G. B. CHAMBERLIN.
BEAN HARVESTER.
APPLICATION FILED MAY 19, 1919.

1,375,565.

Patented Apr. 19, 1921.
3 SHEETS—SHEET 3.

INVENTOR.
G. B. Chamberlin,
BY
ATTORNEYS.

UNITED STATES PATENT OFFICE.

GUY B. CHAMBERLIN, OF VAN NUYS, CALIFORNIA, ASSIGNOR OF ONE-HALF TO JERRY L. HALL, OF HYNES, CALIFORNIA.

BEAN-HARVESTER.

1,375,565.	Specification of Letters Patent.	Patented Apr. 19, 1921.

Application filed May 19, 1919. Serial No. 298,179.

*To all whom it may concern:*

Be it known that I, GUY B. CHAMBERLIN, a citizen of the United States, residing at Van Nuys, in the county of Los Angeles and State of California, have invented new and useful Improvements in Bean-Harvesters, of which the following is a specification.

My object is to make a bean harvester and my invention consists of the novel features herein shown, described and claimed.

Fig. 5 is a vertical longitudinal section on a plane parallel with Fig. 2 and on the line 5—5 of Fig. 1.

Figure 1:
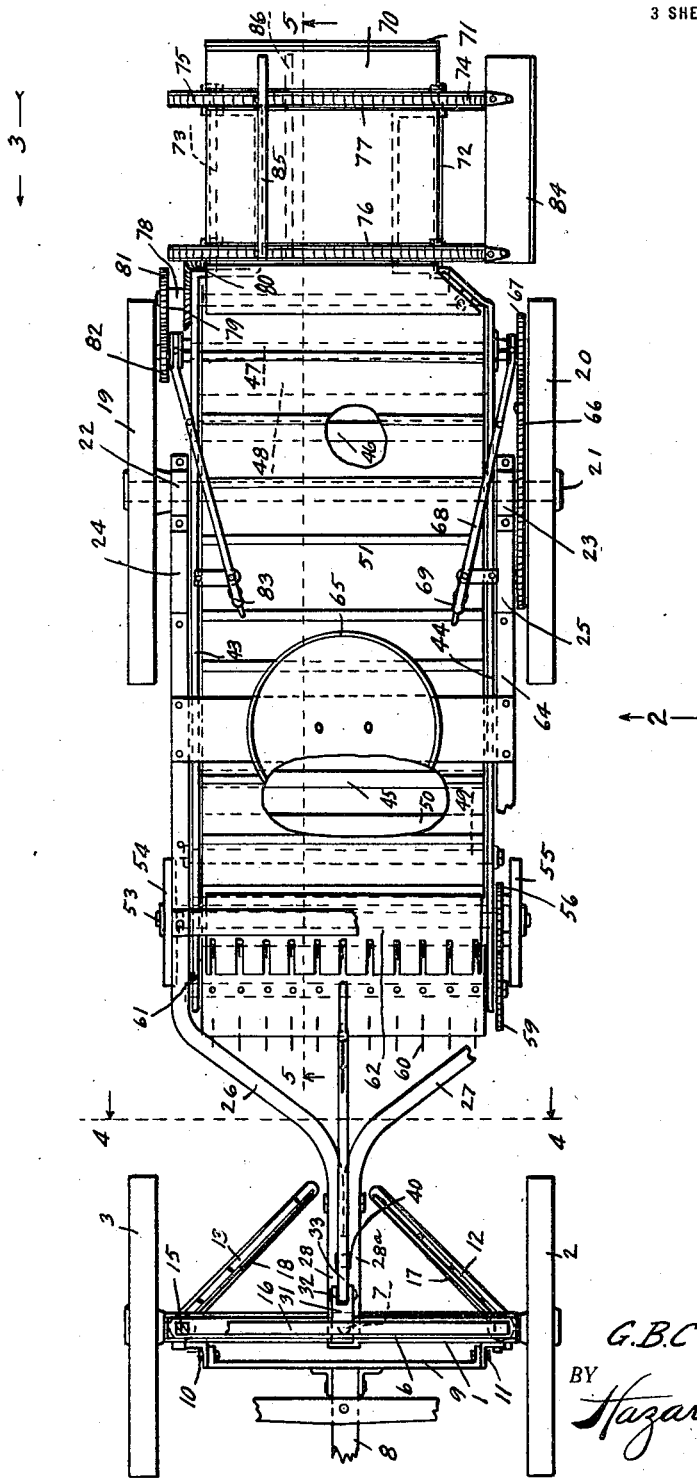
Figure 1 is a top plan view of a bean harvester embodying the principles of my invention, the view being taken looking in the direction indicated by the arrow 1 in Fig. 2.

Referring to the drawing in detail, the front axle 1 is mounted upon the front wheels 2 and 3. Posts 4 and 5 extend upwardly from the axle 1 and the guide bar 6 is rigidly fixed upon the upper ends of the posts 4 and 5 parallel with the axle 1.

The king-bolt 7 is rigidly fixed through the center of the axle 1 and in the center of the guide bar 6 and extends downwardly below the axle 1 a distance substantially equal to the distance from the axle 1 to the guide bar 6.

A draft pole 8 is rigidly connected to a cross bar 9 and the cross bar 9 is hingedly connected to the axle 1 by brackets 10 and 11.

The knives 12 and 13 are rigidly fixed upon the lower ends of reciprocating bars 14 and 15 and the bars 14 and 15 are slidingly mounted through the ends of the axle 1 between the wheels 2 and 3 and through the guide bar 6 and the upper ends of the bars 14 and 15 are rigidly connected by a cross bar 16. The knives 12 and 13 are mounted horizontally and extend backwardly and inwardly from the plane of the axle and have cutting edges 17 and 18.

The rear wheels 19 and 20 are fixed upon the rear axle 21 and the rear axle 21 is rotatably mounted in bearings 22 and 23. The bearings 22 and 23 are fixed upon the rear ends of the side bars 24 and 25 and a rigid frame is built upon the side bars 24 and 25. The forward ends of the side bars 24 and 25 have portions 26 and 27 extending forwardly and inwardly and portions 28 and 28ª extending forwardly and fitting together forming a tongue 28ª.

The king-bolt 7 extends through the forward end of the tongue and the tongue normally rests upon the front axle 1. A bearing 29 fits upon the king-bolt 7 below the axle 1 and a brace 30 extends upwardly from the rear end of the bearing 29 and is fixed in the tongue so as to hold the front axle 1 from tipping forwardly and backwardly.

A U-clip 31 is placed upon the guide bar 6. A bearing 32 extends forwardly from the U-clip 31. An arm 33 is connected to the bearing 32 by a pivot 34. The arm 33 constitutes a portion of a lever 35 extending from the lower rear end of the link 33 at an angle of about 135°.

A latch mechanism 36 is mounted upon the rear end of the hand lever 35 to engage the pivoted sector 37 extending upwardly from the frame. The lower end of the sector 37 is connected to a cross bar 38 and the cross bar 38 is connected to the portions 26 and 27 of the side bars.

A guide link 39 is pivotally connected to the link 33 and hand lever 35 at their junction by a pin 40 and the link 39 extends downwardly through a slot 41 in the tongue. A pin 42 is inserted through the lower end of the link 39 and the rollers 42ª are mounted upon the ends of the pin to engage the lower faces of the tongue members.

Figure 2:
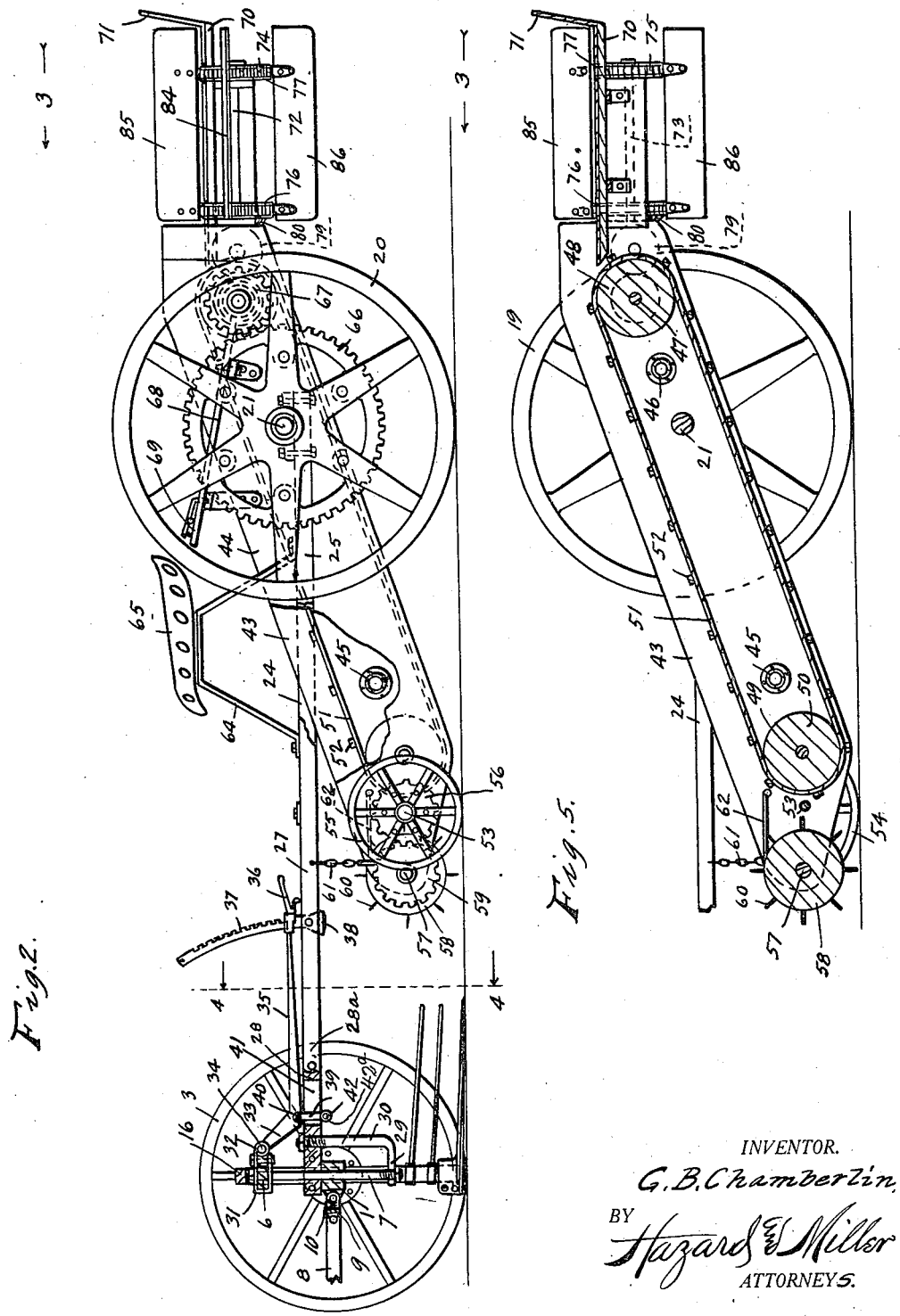
Fig. 2 is a side elevation looking in the direction indicated by the arrow 2 in Fig. 1, parts being broken away and shown in section.
Figure 3:
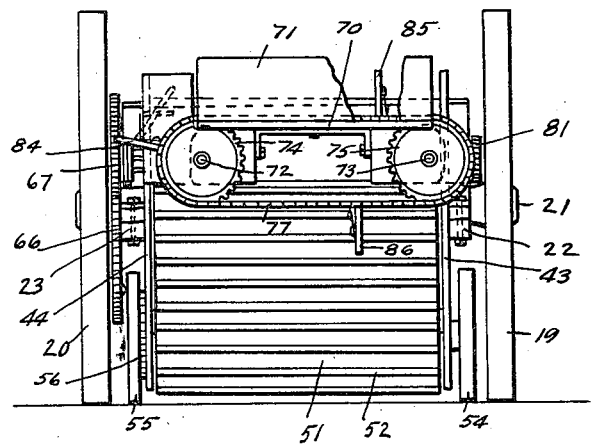
Fig. 3 is a rear elevation looking in the direction indicated by the arrows 3 in Figs. 1, 2 and 5.
Figure 4:
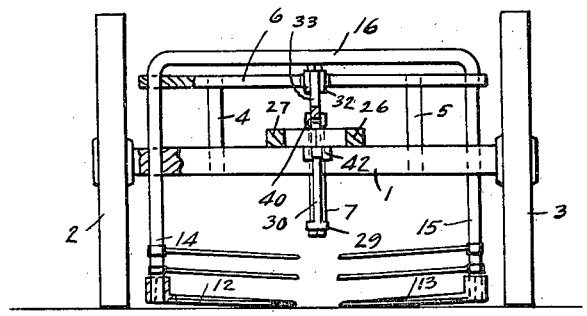
Fig. 4 is a cross section on the lines 4—4 of Figs. 1 and 2 and looking forwardly as indicated by the arrows.

When the latch mechanism 36 is down in the position shown in Fig. 2 the tongue is resting upon the axle 1 and the harvesting mechanism is in position for use. When the latch mechanism is raised to the upper end of the sector 37 the tongue is raised to the guide bar 6, thereby raising the harvesting mechanism out of operative position.

Side plates 43 and 44 are pivotally mounted upon the rear axle 21 and the side plates are rigidly connected together by cross pieces 45 and 46. A shaft 47 is rotatably mounted through the rear ends of the side plates 43 and 44. A roller 48 is fixed upon the shaft 47. A shaft 49 is rotatably mounted through the forward lower ends of the side plates 43 and 44.

A roller 50 is fixed upon the shaft 49 and an endless apron 51 is mounted to run around the rollers 48 and 50, said aprons extending across the machine from the side plate 43 to the side plate 44 and there being cleats 52 upon the apron.

An axle 53 is mounted through the side bars 43 and 44 in front of the shaft 49. Traction wheels 54 and 55 are fixed upon the axle 53. A gear 56 is fixed to the traction wheel 55. A shaft 57 is rotatably mounted through the extreme forward ends of the side plates 43 and 44 in front of the axle 53. A roller 58 is fixed upon the shaft 57. A gear 59 is fixed to the end of the shaft 57 and meshes with the gear 56. Rake teeth 60 extend from the roller 58. Chains 61 connect the forward ends of the side plates 43 and 44 to the side bars 24 and 25.

A guide plate 62 is mounted between the side bars 43 and 44 above the axle 53. The forward edge of the plate 62 is slotted to allow the rake teeth 60 to pass. The traction wheels 54 and 55 run upon the ground and support the forward ends of the side bars 43 and 44 and the operation of the traction wheels in going forwardly will operate the rotating rake carrying the teeth 61 to pick up the bean vines and pass the vines over the roller 58 to the guide plate 62 and continuous operation will press the vines backwardly upon the apron 51.

When the tongue is raised from the axle 1 the chains 61 will raise the forward ends of the side bars 43 and 44 and raise the rake from the ground and raise the traction wheels from the ground and the harvesting mechanism is out of use, as when it is desired to go to and from the bean field.

A bench 64 is mounted upon the side bars 24 and 25 and an operator's seat 65 is mounted upon the bench.

A driving gear 66 is fixed to the rear wheel 20 and meshes with the shifting gear 67 mounted upon one end of the shaft 47. A hand lever 68 is connected to the gear 67 with the handle 69 within reach of the operator upon the seat 65 so that when it is desired to operate the apron 51 the handle 69 is operated to move the gear 67 into mesh with the gear 66 as shown in Fig. 1 and when the harvesting mechanism is to be thrown out of use the handle 69 is operated in the other direction and moves the gear 67 upon the shaft 47 out of mesh with the gear 66.

A platform 70 is rigidly mounted in a horizontal position to extend backwardly from between the side bars 43 and 44 so that the apron 51 will discharge the bean vines on to the platform. A stop plate 71 extends upwardly across the rear end of the platform 70. Shafts 72 and 73 are mounted under the platform 70 and carry sprocket wheels 74 and 75. Chains 76 and 77 run around the sprocket wheels.

A counter shaft 78 is mounted parallel with the shaft 47. A bevel gear 79 fixed upon the shaft 78 meshes with a bevel gear 80 fixed upon the shaft 73. A spur gear 81 is fixed upon the shaft 78 and a shifting gear 82 is slidingly splined upon the shaft 47 to slide into and out of mesh with the gear 81.

The gear 82 is operated by a hand lever 83 mounted within reach of the operator on the seat 65. Boards 84, 85 and 86 are fixed to the chains 76 and 77 crosswise of the chains and evenly spaced apart upon the chains. The hand lever 83 is operated to disconnect the gear 82 from the gear 81 when a board 84, 85 or 86 is in position at the right hand side of the platform. The operation of the harvester will then pile the bean vines upon the platform, and thereafter the lever 83 is operated to connect the gears 82 and 81 to move the board across the platform and dump the beans in a pile.

Any form of clutch may be used for operating the dumper.

It is thought that the operation of the bean harvester is obvious from the foregoing description.

Various changes may be made without departing from the spirit of my invention as claimed.

I claim:

1. A bean harvester comprising a suitable traction mechanism, an endless apron pivotally and operatively mounted upon the traction mechanism, a rotary rake operatively mounted with relation to the apron, a stationary platform at the opposite end of the apron, and dumping means upon the platform operating transversely thereof.

2. A bean harvester comprising a rear axle, wheels on said axle upon which the harvester is supported, an endless apron mechanism pivotally mounted upon the rear axle, traction wheels for supporting the front end of the apron, and a rotary rake mounted in front of the apron mechanism and geared to the traction wheels, so as to pick up bean vines and pass bean vines to the apron.

3. A bean harvester comprising a rear axle, wheels supporting the rear axle, a frame having its rear end mounted upon the rear axle, a front axle, wheels supporting the front axle, a king-bolt mounted through the front axle and through the front end of the frame, means for moving the front end of the frame upwardly and downwardly on the king-bolt, an endless apron mechanism mounted upon the rear axle, traction wheels for supporting the front end of the apron mechanism, a rotary rake mounted in the front end of the apron mechanism and geared to the traction wheels, and flexible connections between the front end of the apron mechanism and the frame, so that the apron mechanism may be raised when the front end of the frame is raised.

4. A bean harvester comprising a main frame, an endless apron mechanism operatively mounted in the frame, a rotary rake mounted in front of the apron mechanism, a platform mounted behind the apron mechanism so that bean vines will be picked up from the ground and piled on the platform, and an endless apron carrying spaced boards for intermittently dumping the bean vines from the platform.

5. In a bean harvester a front axle, a frame mounted for vertical reciprocation relative to the front axle, bean vine cutters fixed upon the frame and adapted to run upon the ground, an endless apron mounted upon the frame, and a platform mounted behind the apron.

In testimony whereof I have signed my name to this specification.

GUY B. CHAMBERLIN.